United States Patent [19]

Von Praun et al.

[11] 3,862,983
[45] Jan. 28, 1975

[54] LIGHTENING THE COLOR OF OLEFIN SULFONATES

[75] Inventors: Ferdinand Von Praun, Lippramsdorf-Freiheit; Kurt Kosswig, Marl, both of Germany

[73] Assignee: Chemische Werke Huels Aktiengesellschaft, Marl, Germany

[22] Filed: Aug. 24, 1973

[21] Appl. No.: 391,494

[30] Foreign Application Priority Data
Aug. 29, 1972 Germany............................ 2242391

[52] U.S. Cl............................ 260/513 R, 260/327 S
[51] Int. Cl.......................................... C07c 143/02
[58] Field of Search..................... 260/504 R, 513 R

[56] References Cited
UNITED STATES PATENTS 3,376,336  4/1968  Stein et al...................... 260/513 R
3,444,087  5/1969  Eccles et al..................... 260/513 R Primary Examiner—Howard T. Mars
Assistant Examiner—Nicky Chan
Attorney, Agent, or Firm—Millen, Raptes & White

[57] ABSTRACT

Colored olefin sulfonates produced by the reaction of long-chain with sulfur trioxide are lightened by heating a mixture of the colored olefin sulfonate, water and a paraffin, olefin or aromatic as solvent under pressure at about 180°–300° C. and pH 11–14 and, while still under pressure, separating the solvent phase containing the colored impurities from the aqueous phase containing the purified olefin sulfonate.

9 Claims, No Drawings

LIGHTENING THE COLOR OF OLEFIN SULFONATES

BACKGROUND OF THE INVENTION

Long-chain olefin sulfonates are utilized as laundry-active compounds and are produced, for example, by the reaction of long-chain olefins, i.e., in the range of $C_8$ - $C_{22}$, preferably α-olefins, with sulfur trioxide. In this process, the olefin is generally treated in the liquid phase with gaseous sulfur trioxide diluted with an inert gas, e.g., air, in a ratio of about 0.2 – 1.7 moles of sulfur trioxide and preferably about 1 – 1.2 moles of sulfur trioxide per 1 mole of the olefin, thus obtaining an "acid mixture" containing sultones and alkenesulfonic acid. This acid mixture is neutralized and subjected to alkaline hydrolysis in order to obtain the desired surface-active substances called olefin sulfonates hereinbelow. The thus-prepared olefin sulfonates are frequently of a dark color, so that the appearance and the marketability of detergent products containing these materials are impaired.

Therefore, a great number of attempts have been made to improve the color of olefin sulfonates. Thus, processes are known, for example, wherein the crude olefin sulfonates are treated with hydrogen peroxide, alkali chlorites, or alkali hypochlorites (German Pat. No. 1,185,178). Also, processes are known wherein the sulfonation products are subjected to a photochemical reaction in the presence of hydrogen peroxide or oxygen (German Unexamined Application DOS 1,955,168 and DOS 2,000,029 and German Published Application DAS 1,280,848. Also, a process is conventional wherein the crude product, which has been neutralized with NaOH and dried, is extracted with alcohols (DOS 1,668,048).

These processes have the disadvantage that either additional chemicals are consumed for the treatment procedure or the treatment is expensive for other reasons, such as, for example, evaporation to dryness.

It is, therefore, an object of this invention to provide an inexpensive process for lightening the color of olefin sulfonate reaction products of olefins and sulfur trioxide. Other objects will be apparent to those skilled in the art to which this invention pertains.

SUMMARY OF THE INVENTION

According to this invention, the color of colored olefin sulfonates produced by the reaction of long-chain olefins with sulfur trioxide is lightened by heating at a pH of 11–14 and under pressure at about 180°–300° C., a mixture of the colored olefin sulfonate, 150–900 percent by weight of water and 3–400 percent by weight of a solvent selected from the group consisting of one or more $C_5$ - $C_{22}$ paraffins and olefins, $C_6$ - $C_{10}$ aromatics, calculated on the olefin sulfonate, and, while still under pressure, separating the thus-formed supernatant solvent phase containing the colored impurities from the aqueous lower phase containing the purified olefin sulfonate.

DETAILED DISCUSSION

The starting olefin sulfonates are long-chain, e.g., $C_8$ - $C_{22}$. Preferred are those conventionally used in detergents, e.g., a mixture of one or more $C_{14}$ - $C_{18}$ olefin sulfonates, e.g., a mixture of $C_{14}$ - $C_{17}$ olefin sulfonates, or a mixture of tetra-, hexa- and octadecene sulfonates. The sulfonates of α-olefins are preferred.

The water content of the starting mixture is 150 percent (150 percent = 40 percent strength olefin sulfonate solution) to 900 percent by weight, based on the olefin sulfonate. The higher the water content, the more complete is the separation of the solvent. However, if the water content is too high, highly diluted olefin sulfonate solutions are obtained, so that the evaporation of the water results in additional expense. For this reason, it is desirable to adjust the water content so that the thus-produced aqueous olefin sulfonate solution is initially obtained in the concentration required for the intended use. It is not recommended to operate at a water content below 150 percent by weight, because α-olefin sulfonate solutions of a corresponding concentration have a tendency to solidify as a gel at an elevated temperature. Furthermore, when the water content is reduced too far, the solvent concentration rises in the sulfonate solution, leading to an impairment of the tenside properties.

Suitable solvents are $C_5$ - $C_{22}$ paraffins and olefins and $C_6$ - $C_{10}$ aromatics. The term "aromatics" means benzenes, which can be substituted by one or more aliphatic radicals, e.g. benzene, toluene, xylene, ethylbenzene or durene. Preferably, solvents are employed which are liquids at ambient temperatures and which do not boil at such low temperatures that excessive pressures build up during the subsequent phase separation step. These conditions are met by paraffins, olefins and aromatics having the above-mentioned carbon ranges, either singly or mixtures thereof.

In a preferred embodiment, the claimed process is an integral part of the sulfonation reaction, which is preferably continuous, in which the sulfonation is terminated before completion, i.e., $SO_3$ is added only until there remains in the reaction mixture 3–400 percent by weight based on the olefin sulfonate of unreacted olefin which is used as the solvent for the decoloration step of this invention. This can be achieved in a continuous process by regulating the dwell time of the olefin mixture in the reactor.

The amount of solvent used is 3–400 percent by weight, based on the starting olefin sulfonate. By increasing the quantity of solvent, the color of the olefin sulfonate becomes lighter but solvent quantities of above 400 percent by weight are not used because additional color-lightening effect achieved is not in an economically tolerable proportion to the expenses incurred in working up the solvent.

With decreasing amounts of solvent, the lightening effect is also reduced so that at below 3 percent by weight, color lightening is not noticeable. An amount of solvent of 5–70 percent by weight is advantageous in the present process. It is self-evident that the amount of solvent added is related to the desired color improvement, i.e., in case of strongly colored olefin sulfonates, a larger amount of solvent is employed than in case of only slightly colored olefin sulfonates. For reasons of economy, it will, therefore, always be desirable to conduct the olefin sulfonation so that initially minimally colored products are obtained.

If a solvent inert to sulfur trioxide under the reaction conditions of olefin sulfonation is employed or if the solvent does not form undesired reaction products with sulfur trioxide, the solvent for the decolorization step can be added prior to the olefin sulfonation, so that the starting olefin sulfonate mixture for the decolorization already contains the requisite solvent. An additional advantage in this connection is that the dilution effect can be exploited, thus obtaining products of improved color from the beginning.

In a preferred embodiment of the process of this invention, the starting olefin sulfonate mixture contains excess olefin not reacted during the sulfonation step, and thus unreacted olefin serves as the solvent for the decolorization step. The process is especially economical in this form.

It is necessary to adjust the pH of the sulfonate solution, after the hydrolysis has been accomplished, to pH 11–14 because below a pH of 11 there is a risk of a subsequent acidification of the olefin sulfonates due to a minor sultone content. As a consequence, interfering decomposition phenomena occur which manifest themselves by a discoloration of the products and by an odor resembling mercaptan. A pH of above 14 is not feasible because the amounts of alkali which must later on be neutralized are too high and result in the undesired formation of neutral salts.

The thus-obtained alkaline mixture of water, olefin sulfonate and solvent is heated, for purposes of phase separation, under internal pressure to 180°–300° C. Internal pressure is that pressure which inherently results from the aqueous mixture being heated in a sealed vessel to this temperature. By heating to this temperature under pressure, the solution separates into a supernatant solvent phase which is substantially free of water and sulfonate and in which the colored impurities are dissolved and into a lower phase which is a homogeneous aqueous sulfonate solution containing only traces of solvent. The higher the temperature at which the phase separation is effected, the lower the proportion of solvent which remains dissolved in the sulfonate phase. A temperature of 300° C. need not be exceeded because no additional significant improvement in the separation of the solvent and in lightening of the color results.

A temperature of about 180° C. is the lower temperature limit for the phase separation because below this temperature a noticeable and especially economically practicable reduction of the solvent content in the sulfonate solution does not occur. Particularly advantageous results are obtained in a temperature range of 220°–280° C.

The olefin sulfonate solution employed for the phase separation may contain sultones which have not as yet been hydrolyzed. These sultones are readily hydrolyzed during the phase separation step and do not affect the process of the present invention, as long as care is taken that the pH does not drop below 11 as a result of their hydrolysis.

The process of this invention can be conducted discontinuously or also continuously. In commercial operations, a continuous process is preferred.

A primary advantage of the process of this invention is that it is now possible in the sulfonation of olefins to eliminate short-term sulfurizing reactors which are structurally complicated and correspondingly expensive and instead conduct the reaction in simple reactors. Furthermore, by the process of this invention, which can advantageously also include the hydrolysis of sultones that is normally required anyway, almost colorless olefin sulfonates of a low neutral oil content can be obtained, which otherwise could be produced only by a more cumbersome procedure.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

In a three-necked flask having a one-liter capacity and equipped with a thermometer, a gas feed pipe extending to the bottom of the flask, a reflux condenser, and a high-speed agitator, 166 g. (0.74 mole) of a mixture of α-olefins consisting of almost equal parts of tetra-, hexa-, and octadecene and having an average C-number of 15.9 and an iodine number of 113.7, was sulfonated under vigorous agitation by the introduction of a sulfur trioxide-nitrogen mixture containing approximately 4 percent by volume of $SO_3$. During the course of 1 hour, 71.2 g. (0.89 mole) of $SO_3$ was charged into the flask. After the sulfonation was terminated, the brown reaction product was diluted by adding water and neutralized without cooling with 50 percent strength sodium hydroxide solution, consuming 0.67 mole of NaOH. By heating the solution under reflux for 1 hour to 100° C. and further addition of sodium hydroxide solution under constant control of the pH, the hydrolysis was effected. The weakly alkaline, aqueous olefin sulfonate solution had an iodine color number of 19.5 (based on a solution of the olefin sulfonate containing 1 900 wt. percent water, calculated on the olefin sulfonate).

The sulfonate solution was brought to pH 13 by the addition of sodium hydroxide solution, giving a solution containing 11.6 wt. percent of solvent consisting predominantly of unreacted olefins and 502 wt. percent of water, calculated on the olefin sulfonate, which was then heated in an autoclave to 260° C. for 60 minutes, the pressure being that resulting inherently from the mixture being heated in a sealed vessel. While still maintaining the autoclave under internal pressure, the aqueous bottom phase was then withdrawn by means of a riser in communication with a cooling coil via a valve. The clear olefin sulfonate solution contained 2.2 percent solvent (based on the olefin sulfonate) and had an iodine color number of 14.6 (based on a solution of the olefin sulfonate containing 1 900 wt. percent of water, calculated on the olefin sulfonate).

EXAMPLE 2

Analogously to Example 1, 166 g. (0.74 mole) of the same olefin mixture was sulfonated by the introduction of 55.6 g. (0.695 mole) of sulfur trioxide as a $SO_3/N_2$ mixture during the course of 53 minutes. The dark-colored reaction product was neutralized and hydrolyzed as described above. The formed olefin sulfonate solution has an iodine color number of 13.7 (based on a solution of the olefin sulfonate containing 1 900 wt. percent water, calculated on the olefin sulfonate).

The olefin sulfonate solution was adjusted to an alkaline condition (pH 13), to give a solution containing 20.9 wt. percent of solvent consisting predominantly of unreacted starting olefins and 460 wt. percent of water, calculated on the olefin sulfonate, which was then heated in a sealed autoclave to 260° C. for 60 minutes. After the phase separation step, a clear sulfonate solution was obtained having a solvent content of 1.8 percent (based on the olefin sulfonate) and an iodine color number of 7.8 (based on a solution of the olefin sulfonate containing 1 900 wt. percent of water, calculated on the olefin sulfonate).

EXAMPLE 3

In accordance with Example 1, 166 g. (0.74 mole) of the same olefin mixture was sulfonated by the introduction of 46 g. (0.575 mole) of sulfur trioxide as a $SO_3/N_2$ mixture during the course of 42 minutes. The dark reaction product was neutralized and hydrolyzed as set forth above. The formed olefin sulfonate solution had an iodine color number of 4.5 (based on a solution of the olefin sulfonate containing 1 900 wt. percent of water (calculated on the olefinsulfonate).

The olefin sulfonate solution was adjusted to an alkaline condition (pH 13) to give a solution containing 53.9 wt. percent solvent consisting predominantly of starting olefins and 647 wt. percent of water, calculated on the olefin sulfonate, which was then heated in an autoclave to 260°C. for 120 minutes. After the phase separation, a clear sulfonate solution was obtained having a solvent content of 0.5 percent (based on the olefin sulfonate) and an iodine color number of 1.6 (based on a solution of the olefin sulfonate containing 1 900 wt. percent of water (calculated on the olefinsulfonate).

EXAMPLE 4

In a laboratory falling-film reactor having a length of 1.4 m. and an internal diameter of 0.8 cm., 116.5 g. (0.52 mole) of the olefin mixture used in Example 1 was sulfonated with 46 g. (0.575 mole) of sulfur trioxide at a temperature of 40° C. The $SO_3$ was utilized in a mixture with nitrogen, containing 5.8 percent by volume of $SO_3$. The nitrogen was introduced into the olefin mixture at a rate of 42 l./min. A small portion of the dark-colored sulfonation mixture was neutralized and hydrolyzed in the manner described above. The thus-obtained olefin sulfonate solution contained 7.6 wt. percent of a solvent consisting predominantly of unreacted olefins and 368 wt. percent of water (based on the olefin sulfonate) and had an iodine color number of 7.1 (based on a solution of the olefinsulfonate containing 1 900 wt. percent of water (calculated on the olefin sulfonate).

The larger portion of the olefin sulfonation product was combined with an amount of sodium hydroxide solution calculated for neutralization and hydrolysis on the basis of $SO_3$ absorption to obtain a pH of 13, giving a mixture containing olefin sulfonate, sultones, unreacted olefins, sodium hydroxide and water, which was heated in an autoclave to 260° C. and maintained at that temperature for 120 minutes. After phase separation, a clear sulfonate solution was produced having a solvent content of 1.6 percent (based on the olefin sulfonate) and an iodine color number of 3.3 (based on a solution of the olefin sulfonate containing 1 900 wt. percent of water, calculated on the olefin sulfonate).

EXAMPLE 5

In the laboratory falling-film reactor employed in Example 4, 186 g. (0.83 mole) of the olefin employed in the above examples was sulfonated with 48.8 g. (0.61 mole) of sulfur trioxide at a temperature of 40° C. The $SO_3$ was utilized in the form of a mixture with nitrogen containing 3.8 percent by volume of $SO_3$. The introduction rate for the gaseous mixture was 43.7 liters/min. A small portion of the colored sulfonation mixture was neutralized and hydrolyzed as described above. The thus-obtained olefin sulfonate solution contained 44 wt. percent of a solvent consisting primarily of unreacted olefin and 519 wt. percent of water (based on the olefin sulfonate) and had an iodine color number of 1.9 (based on a solution of the olefin sulfonate containing 1 900 wt. percent of water, calculated on the olefin sulfonate).

The larger portion of the acidic reaction product was mixed as described in Example 4 with sodium hydroxide solution and was then heated to 260° C. for 120 minutes in an autoclave. After phase separation, a clear sulfonate solution was produced having a solvent content of 2.7 percent (based on the olefin sulfonate) and an iodine color number of 1.4 (based on a solution of the olefin sulfonate containing 1 900 wt. percent of water, calculated on the olefin sulfonate).

EXAMPLE 6

Employing a technical construction of a special sort of ring-gap reactor as described in German Published Application DAS 1,543,168 a mixture of α-olefins consisting predominantly of $C_{15}$ - $C_{18}$ olefins (average carbon number 16.2) and having an iodine number of 118.4 was sulfonated with sulfur trioxide in a molar ratio of 1 : 1.2 at a temperature of 20° C. The $SO_3$ was used in this process in the form of a mixture with air containing 5 percent by volume of $SO_3$. The dark-colored sulfonation product was hydrolyzed, after neutralization, for one hour at 130° C. The resultant olefin sulfonate solution thereafter had an iodine color number of 15.1 (based on a solution of the olefin sulfonate containing 1 900 wt. percent of water, calculated on the olefin sulfonate).

The sulfonate solution was adjusted to an alkaline condition (pH 13) to give a solution containing 12.2 wt. percent solvent consisting primarily of unreacted olefin and 268 wt. percent water, calculated on the olefin sulfonate, which was thereafter heated in an autoclave to 280° C. for 60 minutes. After phase separation, a clear sulfonate solution was obtained having a solvent content of 1.0 percent (based on the olefin sulfonate) and an iodinecolor number of 8.6 (based on a solution of the olefin sulfonate containing 1 900 wt. percent of water, calculated on the olefin sulfonate).

In the laboratory falling-film reactor of Example 4, a mixture of 58 g (0.296 mole) of 7-tetradecene and 225 g. of a $C_{14}$ - $C_{17}$ paraffin mixture having an average C number of 15.2 was sulfonated with 26.9 g. (0.336 mole) of sulfur trioxide at a temperature of 40° C. The $SO_3$ was utilized in a mixture with nitrogen containing 3.1 percent by volume of $SO_3$. The feed rate for the sulfonation gas was 43.0 l./min. The colored sulfonation product was neutralized and hydrolyzed in the manner described above. A small portion of the product was rendered oil-free with pentane, after the addition of ethanol, and the iodine color number of an aqueous solution of the olefin sulfonate containing 1 900 wt. percent of water, calculated on the olefin sulfonate, was determined to be 7.8.

The larger portion of the hydrolyzed product was adjusted to an alkaline value (pH 13) to give a solution containing 260 wt. percent solvent and 410 wt. percent water, calculated on the olefin sulfonate, which was thereafter heated in an autoclave to 260° C. for 60 minutes. After the phase separation, a clear sulfonate solution was obtained having a solvent content of 0.4 percent (based on the olefin sulfonate) and an iodine color number of 6.1 (based on a solution of the olefin sulfonate containing 1 900 wt. percent of water, calculated on the olefin sulfonate).

EXAMPLE 8

In the laboratory falling-film reactor of Example 4, 240 g. (1.07 moles) of a hexadecene mixture consisting of 66 percent of 1-hexadecenes with internally positioned double bonds was sulfonated with 104 g. (1.3 moles) of sulfur trioxide at a temperature of 40° C. The $SO_3$ was employed in the form of a mixture with nitrogen containing 3.9 percent by volume of $SO_3$. The nitrogen was introduced into the olefin mixture at a rate of 41.5 l./min. The colored sulfonation product was neutralized and hydrolyzed in the aforedescribed manner. The resultant olefin sulfonate solution had an iodine color number of 9.1 (based on a solution of the olefin sulfonate containing 1 900 wt. percent of water, calculated on the olefin sulfonate).

The sulfonate solution, adjusted to an alkaline (pH 13) condition, having a 14.4 wt. percent solvent consisting predominantly of unreacted olefin content and a 317 wt. percent water content, based on the olefin sulfonate, was subsequently heated in an autoclave to 260° C. for 120 minutes. After the phase separation, a clear solution was obtained having a solvent content of 1.1 percent (based on the olefin sulfonate) and an iodine color number of 3.5 (based on a solution of the olefin sulfonate containing 1 900 wt. percent of water, calculated on the olefin sulfonate).

EXAMPLES 9–14

In the laboratory falling-film reactor of Example 4, 890 g. (3.97 moles) of the olefin mixture used as starting material in Examples 1–5 was sulfonated with 370 g. (4.63 moles) of sulfur trioxide at a temperature of 40° C. The $SO_3$ was utilized in a mixture with nitrogen containing 3.8 percent by volume of $SO_3$. The feed rate for the gaseous mixture was 45.7 l./min. The colored sulfonation product was neutralized and hydrolyzed as described hereinabove and thereafter, following dilution with methanol, was freed of unreacted olefin with pentane. The thus-obtained, methanol-free aqueous olifin sulfonate solution contained 1.0 percent olefin (based on the olefin sulfonate) an had an iodine color number of 5.1 (based on a solution of the olefin sulfonate containing 1 900 wt. percent of water, calculated on the olefin sulfonate).

The sulfonate solution, adjusted to an alkaline value, was mixed respectively with a stoichiometric quantity of various solvents in order to provide a solvent content of 57.6 percent (based on the olefin sulfonate) and a water content of 589 percent thereafter heated in an autoclave to 280° C. for 30 minutes. After the phase separation, clear olefin sulfonate solutions were obtained, the solvent contents of which (based on the olefin sulfonate) and the iodine color numbers (based on a solution of the olefin sulfonate containing 1 900 wt. percent of water, calculated on the olefin sulfonate) of these solutions are set forth in the table below.

| Example | Solvent | Solvent Content Sulfonate Sol. After Phase Separation | Iodine Color Number |
|---|---|---|---|
| 9 | Heptane | 1.2 % | 1.8 |
| 10 | $C_{14}/C_{17}$ Paraffin (average C no. 15.2) | 1.1 % | 1.7 |
| 11 | 1-Octene | 2.2 % | 2.2 |
| 12 | 1-Octadecene | 0.6 % | 2.3 |
| 13 | Benzene | 1.1 | 1.5 |
| 14 | Durene | 5.7 % | 1.0 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. What is claimed is:

1. In a process for lightening the color of colored olefin sulfonates produced by reacting longchain olefins of 8 to 22 carbon atoms with sulfur trioxide followed by alkaline hydrolysis of the reaction product, the improvement which comprises heating at about 180–300°C, at a pH of 11–14, and in a sealed vessel under pressure, a mixture of the colored olefin sulfonate, 150–900 percent by weight of water and 3–400 percent by weight of a solvent selected from the group consisting of one or more of $C_5$ - $C_{22}$ paraffins, $C_5$ - $C_{22}$ olefins and $C_6$ - $C_{10}$ aromatic hydrocarbons, calculated on the olefin sulfonate, and, while still under pressure, separating the thus-formed supernatant solvent phase containing the colored impurities from the aqueous lower phase containing the purified olefin sulfonate.

2. A process according to claim 1 wherein residual unoxidized olefin remaining after the reaction of the olefin with sulfur trioxide is employed as the solvent.

3. A process according to claim 1, wherein a mixture of the olefin sulfonate, 150–900 percent by weight of water and 5–70 percent of the solvent is heated to about 220°–280° C.

4. A process according to claim 1 wherein the olefin is one or more of $C_{14}$ - $C_{18}$ olefins.

5. A process according to claim 1 wherein the olefin is a mixture of tetra-, hexa- and octadecene.

6. A process according to claim 1, which comprises the steps of partially sulfonating one or more $C_{14}$ - $C_{18}$ olefins with sulfur trioxide and, after adjusting its pH to 11–14 and adding the requisite water, employing as starting material for the decolorizing heating step the resulting colored alkaline aqueous mixture of olefin sulfonate and residual excess of olefin.

7. A process according to claim 6, wherein a mixture of the olefin sulfonate, 150–900 percent by weight of water and 5–70 percent of the solvent is heated to about 220°–280° C.

8. A process according to claim 7 wherein the olefin is one or more of $C_{14}$ - $C_{18}$ olefins.

9. A process according to claim 8 wherein the olefin is a mixture of tetra-, hexa- and octadecene.

* * * * *